Patented Sept. 8, 1953

2,651,643

UNITED STATES PATENT OFFICE 2,651,643

PURIFICATION OF DESOXYCHOLIC ACID

Robert H. Sifferd, Joliet, and Jerry J. Svarz, Chicago, Ill., assignors, by mesne assignments, to Armour and Company, Chicago, Ill., a corporation of Illinois No Drawing. Application June 19, 1951, Serial No. 232,452

4 Claims. (Cl. 260—397.1)

This invention relates to a process for the purification of desoxycholic acid.

It is well-known to those familiar with bile acid isolation and purification that the purification of desoxycholic acid by recrystallization from organic solvents is an operation usually resulting in poor yields of the purified acid, or requiring repeated recrystallization to obtain material of suitable purity for synthetic chemical work.

An object of the present invention is to provide a process by which the above described purification is accomplished in simple and convenient procedure with high yields of the purified acid. A further object is to provide convenient and simplified procedure by which the purification is accomplished particularly in connection with the removal of chromic acid, which frequently contaminates commercial grades of desoxycholic acid. Other specific objects and advantages will appear as the specification proceeds.

The invention is found to be particularly useful in connection with the removal of cholic acid as a contaminant for commercial grades of desoxycholic acid. In one treatment by the method which we have discovered, it was found that the cholic acid contained in the desoxycholic acid was reduced from 20% to less than 1.5% with a recovery of more than 90% of the desoxycholic acid contained in the starting material.

As one specific example of the process, the following may be set out. Methyl ethyl ketone is an organic solvent which is only partially miscible with water at temperatures below its boiling point and atmospheric pressure, forming an equilibrium composition with water dependent upon temperature, and comprising a supernatant phase rich in methyl ethyl ketone and a subnatant phase poor in ketone. The ketone-rich phase is an excellent solvent for cholic acid while the ketone-poor (subnatant) phase is a poor solvent for desoxycholic acid. By using methyl ethyl ketone in the presence of water, we have been able to achieve the above-described results.

Crude desoxycholic acid is dissolved with heat in an equilibrium mixture of said ketone in water, adjusting the quantity of ketone-rich phase in proportion to the quantity of contaminating cholic acid which is to be removed. This operation is conveniently performed by heating the crude desoxycholic acid in sufficient of the ketone-rich equilibrium composition to effect solution at the boiling point, then adding water to dilute the mixture to the desired proportion of the two-phase equilibrium mixture. Upon cooling the mixture, substantially all of the desoxycholic acid crystallizes out, while the relatively small amount of supernatant ketone-rich phase holds substantially all of the contaminating cholic acid in solution.

If desired, a mixture of desoxycholic and cholic acids may be dissolved in a saturated solution of methyl ethyl ketone in water, while adding additional methyl ethyl ketone in proportion to the quantity of cholic acid in the mixture, and then cooling the mixture to crystallize the desoxycholic acid. The crystallized material may then be separated by centrifugation, filtration, or any other well-known method.

Specific examples of the process may be set out as follows:

Example I 200 kg. desoxycholic acid (containing approximately 20% cholic acid by colorimetric estimation) is dissolved in 800 liters of a mixture 86% methyl ethyl ketone and 14% water by heating to the boiling point. The solution is filtered, and the hot filtrate diluted by the addition of 1370 liters of water heated to 60° C. The mixture is cooled to room temperature and the crystalline desoxycholic acid is collected by means of the basket centrifuge, washed with a small volume of 86% methyl ethyl ketone and then with a small volume of 26% methyl ethyl ketone (74% water). The centrifuge cake on drying contains 1.7% cholic acid.

Example II

A process was carried out as above-described in Example I, except that the desoxycholic acid containing approximately 20% of cholic acid by colorimetric estimation was dissolved in a saturated solution of methyl ethyl ketone in water. Additional methyl ethyl ketone was then added in proportion to the quantity of cholic acid in the mixture. The mixture was then treated as described in Example I, being cooled to crystallize the desoxycholic acid and the material being filtered to separate the crystallized desoxycholic acid.

While in the foregoing specification we have set forth process steps in considerable detail, for the purpose of illustrating embodiments of the invention, it will be understood that such details may be varied widely by those skilled in the art without departing from the spirit of our invention.

We claim:

1. In a process for the separation of desoxycholic acid from a mixture of cholic and desoxycholic acids, the steps of dissolving the mixture of acids in a solution of methyl ethyl ketone in water to form a supernatant phase rich in methyl ethyl ketone and a subnatant phase poor in said ketone, adding water thereto, and separating the desoxycholic acid crystals from the two-phase liquid mixture.

2. In a process for the separation of desoxycholic acid from a mixture of cholic and desoxycholic acids, the steps of dissolving the mixture of acids in an equilibrium mixture of methyl ethyl ketone in water, said equilibrium mixture comprising a supernatant phase rich in methyl ethyl ketone and a subnatant phase thereof poor in ketone, said cholic acid becoming concentrated in said ketone-rich phase, adding water, cooling the mixture to crystallize the desoxycholic acid, and separating the crystallized material from the liquid.

3. In a process of the character set forth, the steps of dissolving a mixture of cholic and desoxycholic acids in a solution of methyl ethyl ketone in water, adding sufficient water to maintain a ketone-rich fraction in which said cholic acid is retained, and cooling the mixture to crystallize the desoxycholic acid.

4. In a process for treating a mixture of cholic and desoxycholic acids, the steps of dissolving the mixture in a solution of methyl ethyl ketone in water forming a supernatant phase rich in methyl ethyl ketone and a subnatant phase poor in ketone, said ketone-rich fraction tending to retain the cholic acid therein, adding water to reduce the ketone-rich fraction while retaining the cholic acid therein, and cooling the mixture to crystallize the desoxycholic acid.

ROBERT H. SIFFERD.
JERRY G. SVARZ.

References Cited in the file of this patent

Gauthier: Chem. Abst. 42, column 7308–7309 (1948).